(12) United States Patent
White et al.

(10) Patent No.: US 11,499,641 B2
(45) Date of Patent: Nov. 15, 2022

(54) VALVE BODY, VALVE SEAT, AND VALVE WITH CONVEX SEALING SURFACES

(71) Applicant: Schaeffler Technologies AG & Co. KG, Herzogenaurach (DE)

(72) Inventors: Michael White, Lake Wylie, SC (US); Chris Hutchison, Gastonia, NC (US); Michael Conlin, Rock Hill, SC (US); Eric Ovendorf, Weddington, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 247 days.

(21) Appl. No.: 16/884,634

(22) Filed: May 27, 2020

(65) Prior Publication Data

US 2021/0372528 A1  Dec. 2, 2021

(51) Int. Cl.
| | |
|---|---|
| *F16K 1/38* | (2006.01) |
| *F16K 1/42* | (2006.01) |
| *F16K 25/00* | (2006.01) |
| *F16K 1/12* | (2006.01) |

(52) U.S. Cl.
CPC .................. *F16K 1/38* (2013.01); *F16K 1/12* (2013.01); *F16K 1/42* (2013.01); *F16K 25/00* (2013.01)

(58) Field of Classification Search
CPC ..... F16K 1/12; F16K 1/38; F16K 1/42; F16K 25/00
See application file for complete search history.

(56) References Cited

U.S. PATENT DOCUMENTS

| | | | | |
|---|---|---|---|---|
| 1,950,575 A | * | 3/1934 | Smolensky | F16K 15/063 137/512.1 |
| 2,897,855 A | | 8/1959 | Wadas | |
| 3,053,500 A | * | 9/1962 | Atkinson | F16K 1/38 251/332 |
| 3,145,733 A | * | 8/1964 | Shaw | F16K 1/38 137/881 |
| 7,108,244 B2 | * | 9/2006 | Hardin | F16K 25/00 251/120 |
| 2014/0352803 A1 | * | 12/2014 | Onuma et al. | F01L 3/14 137/340 |
| 2020/0400140 A1 | * | 12/2020 | Bayyouk | F16K 15/026 |

* cited by examiner

*Primary Examiner* — David Colon-Morales
(74) *Attorney, Agent, or Firm* — Volpe Koenig

(57) ABSTRACT

A valve, including: a valve seat including a seating surface with an outer edge furthest, an inner edge, and a first portion; and a valve body including a sealing surface with an outer edge, an inner edge, and a first portion. In a closed position, the first portion of the sealing surface is in contact with the first portion of the seating surface to block flow through the valve. The sealing surface tapers from the first portion of the sealing surface to the inner edge of the sealing surface or the outer edge of the sealing surface, or the seating surface tapers from the first portion of the seating surface to the inner edge of the seating surface or the outer edge of the seating surface. In the open position, the first portion of the sealing surface is free of contact with the first portion of the seating surface.

20 Claims, 13 Drawing Sheets

VALVE BODY, VALVE SEAT, AND VALVE WITH CONVEX SEALING SURFACES

TECHNICAL FIELD

The present disclosure relates to a valve with a convex sealing surface, a valve seat with a convex seating surface, and a valve assembly including the valve and the valve seat.

BACKGROUND

FIG. 18 is a cross-sectional view of prior art valve 200 in a closed position. Valve 200 includes valve body 202 and valve seat 204. Valve body 202 includes sealing surface 206 and valve seat 204 includes seating surface 208 in contact with sealing surface 206. In the cross-sectional view of FIG. 18, surface 206 and surface 208 form respective straight lines. Stress lines SL1 represent stress levels on sealing surface 206 and seating surface 208 for valve 200 transitioning to the closed position. As seen in FIG. 18, stress levels are considerably higher at the edges of surfaces 206 and 208.

SUMMARY

According to aspects illustrated herein, there is provided a valve body, including: a base portion including a radially outer edge; and a sealing surface connected to the base portion, circumferentially disposed around a central axis, and including a first portion including a radially inner edge of the sealing surface, a second portion including a radially outer edge of the sealing surface, and a third portion connecting the first portion and the second portion. The base portion is arranged to be displaced to contact the third portion of the sealing surface with a seating surface of a valve seat of a valve to block flow through the valve. The first portion of the sealing surface tapers from the third portion of the sealing surface to the radially inner edge of the sealing surface, or the second portion of the sealing surface tapers from the third portion of the sealing surface to the radially outer edge of the sealing surface.

According to aspects illustrated herein, there is provided a valve seat, including: a base portion; and a seating surface connected to the base portion, circumferentially disposed around a central axis, and including a first portion including a radially inner edge of the seating surface, a second portion including a radially outer edge of the seating surface, and a third portion connecting the first portion and the second portion. The third portion of the seating surface is arranged to be contacted by a sealing surface of a valve body of a valve to block flow through the valve. The first portion of the seating surface tapers from the third portion of the seating surface to the radially inner edge of the seating surface, or the second portion of the seating surface tapers from the third portion of the seating surface to the radially outer edge of the seating surface.

According to aspects illustrated herein, there is provided a valve, including: a valve seat circumferentially disposed around a central axis and including a seating surface with a radially outer edge furthest from the central axis, a radially inner edge closest to the central axis, and a first portion; and a valve body circumferentially disposed around the central axis and including a sealing surface with a radially outer edge furthest from the central axis, a radially inner edge closest to the central axis, and a first portion. The valve body is displaceable between a closed position and an open position. In the closed position of the valve, the first portion of the sealing surface is in contact with the first portion of the seating surface to block flow through the valve. The sealing surface tapers from the first portion of the sealing surface to one of the radially inner edge of the sealing surface or the radially outer edge of the sealing surface, or the seating surface tapers from the first portion of the seating surface to one of the radially inner edge of the seating surface or the radially outer edge of the seating surface. In the open position of the valve, the first portion of the sealing surface is free of contact with the first portion of the seating surface.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

The conjunction or is not used as an "exclusive or" in the present disclosure. For example, the following conditions satisfy the phase, "element X or element Y": element X and not element Y; element Y and not element X; and element X and element Y.

Figure 1:
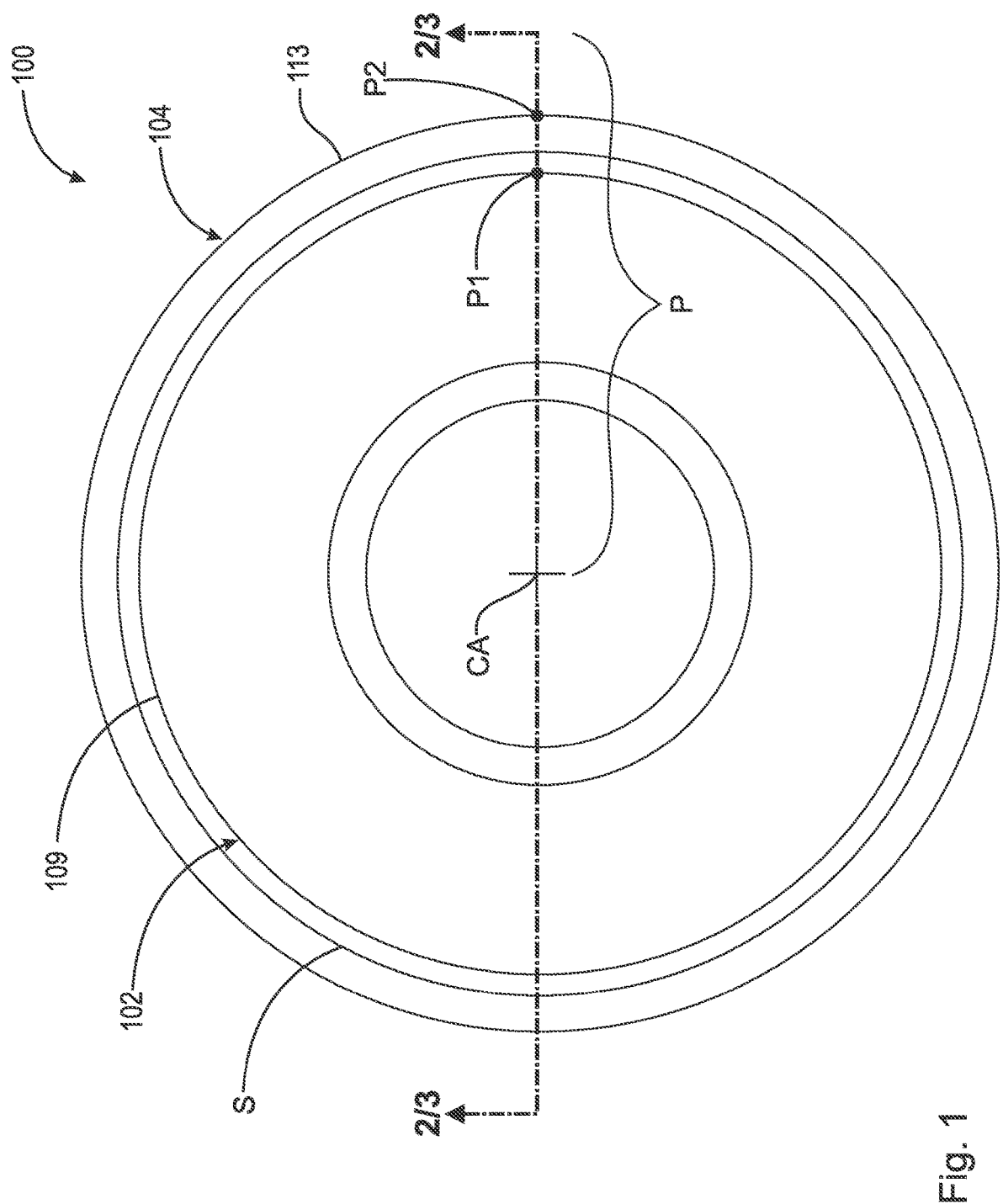
FIG. 1 is a top view of a valve with at least one convex seal surface.

FIG. 1 is a top view of a valve, with at least one convex seal surface.

Figure 2:
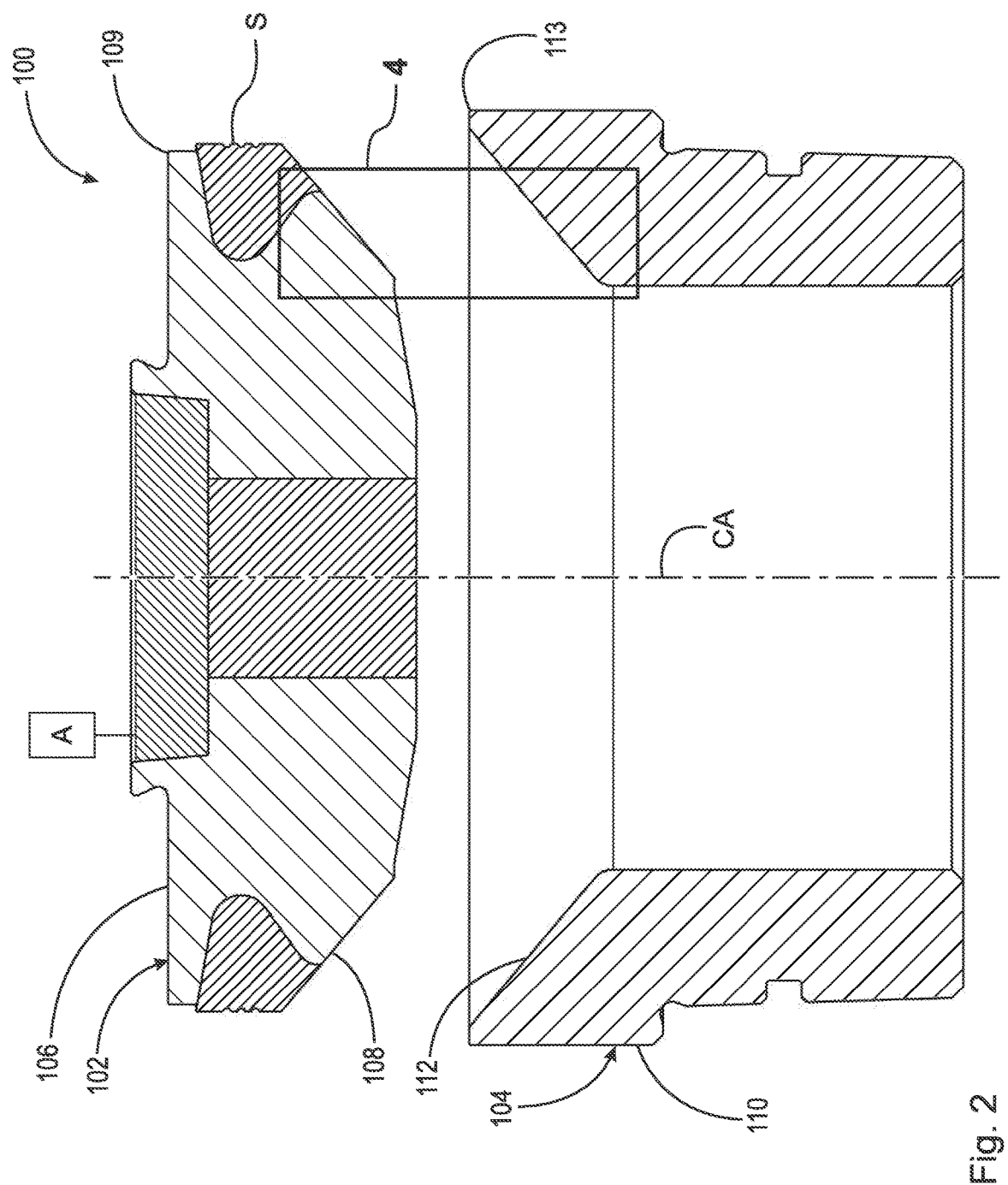
FIG. 2 is a cross-sectional view generally along line 2/2-2/3 in FIG. 1 with the valve in an open position.

FIG. 2 is a cross-sectional view generally along line 2/2-2/3 in FIG. 1 with the valve in an open position.

Figure 3:
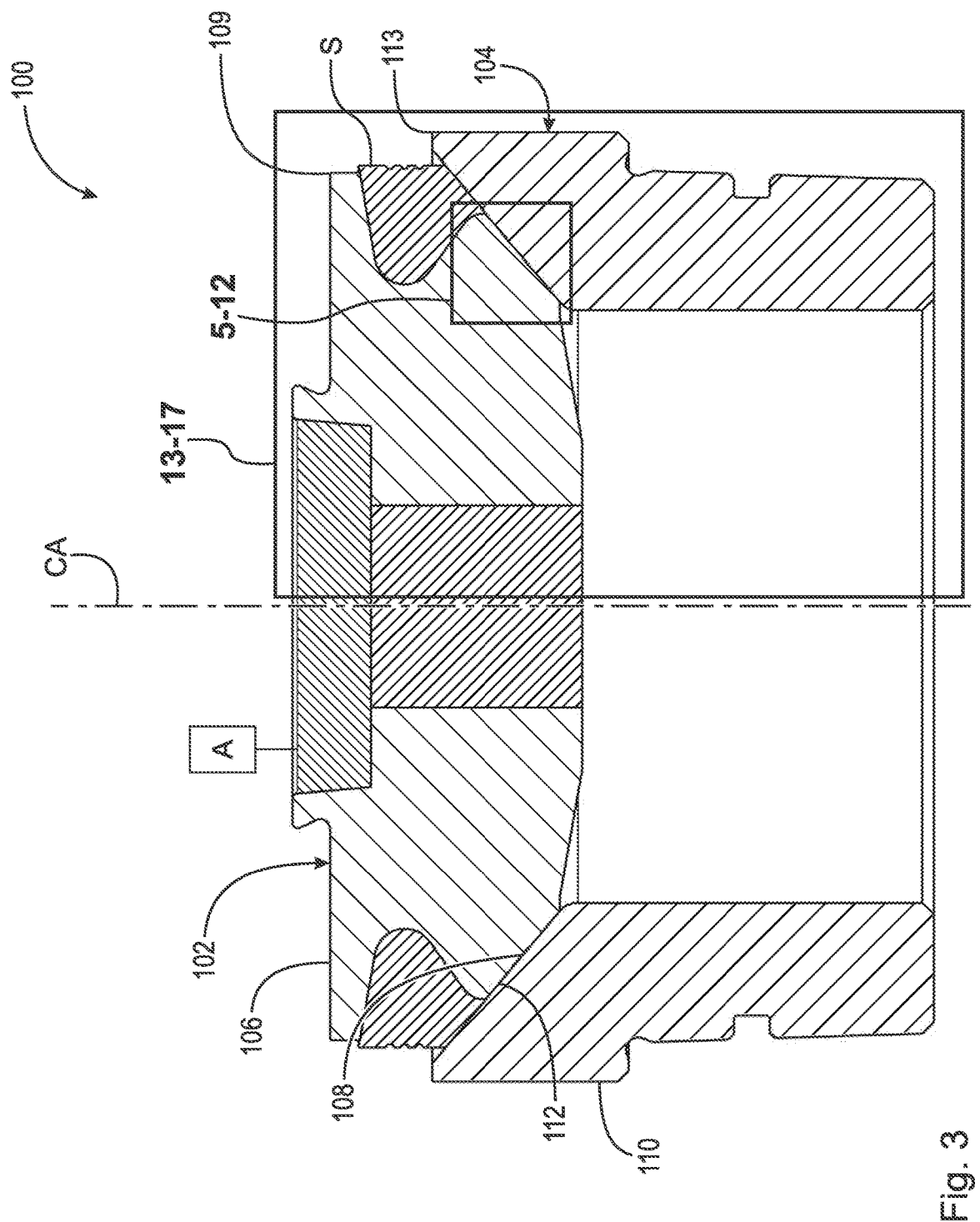
FIG. 3 is a cross-sectional view generally along line 2/2-2/3 in FIG. 1 with the valve in a closed position.

FIG. 3 is a cross-sectional view generally along line 2/2-2/3 in FIG. 1 with the valve in a closed position.

Figure 4:
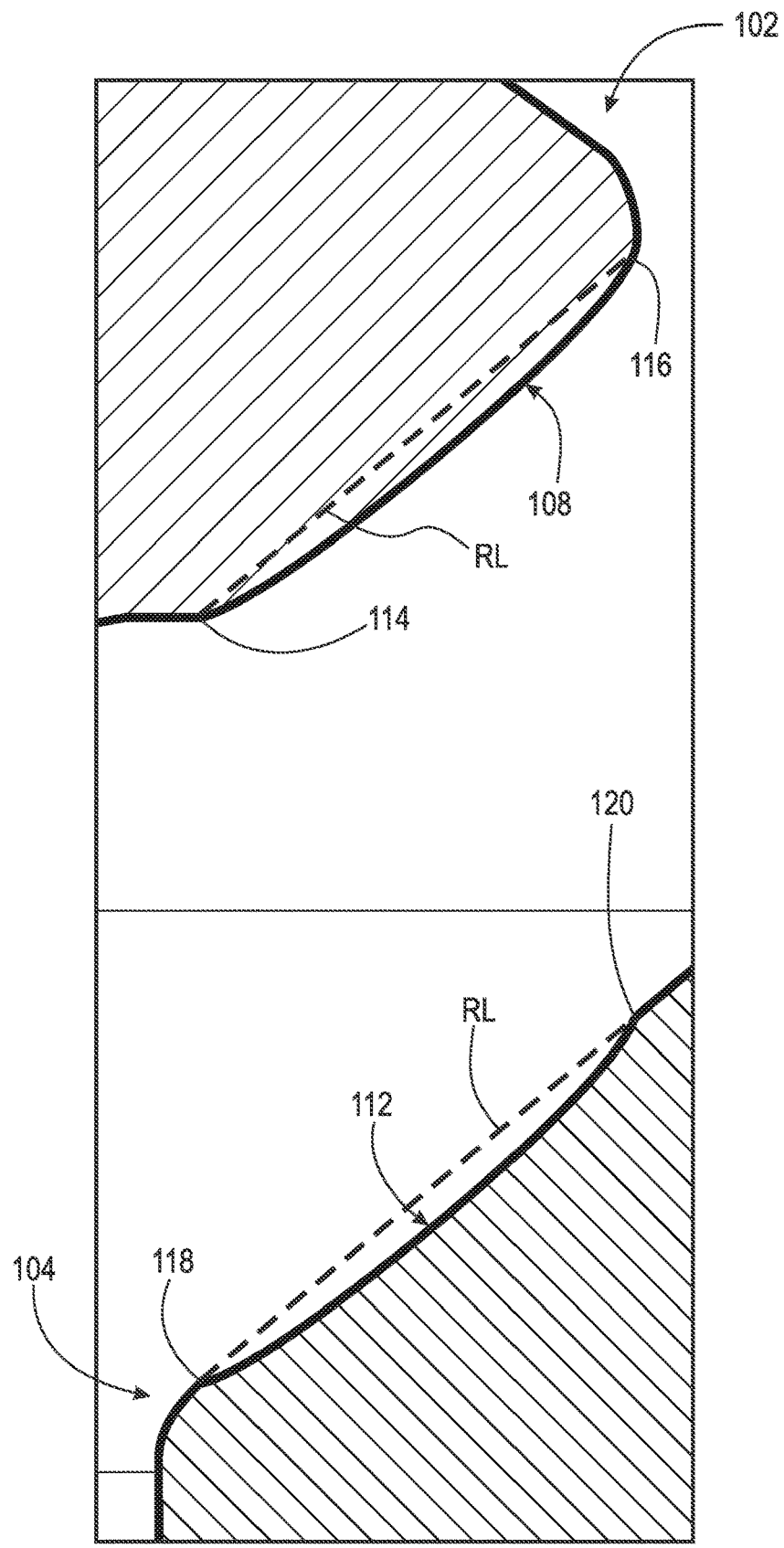
FIG. 4 is a detail of area 4 in FIG. 2.

FIG. 4 is a detail of area 4 in FIG. 2.

Figure 5:
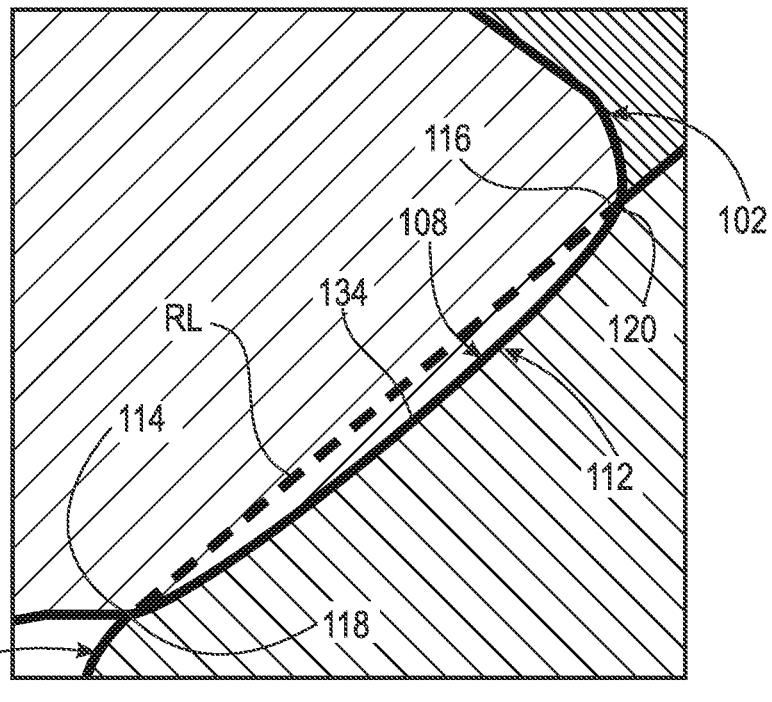
FIG. 5 is a detail of area 5-12 in FIG. 3.

FIG. 5 is a detail of area 5-12 in FIG. 3. Valve 100 includes valve body 102 and valve seat 104. Valve body 102 includes base portion 106, sealing surface 108 connected to base portion 106, and radially outermost edge 109. In an example embodiment, surface 108 is integral to base portion 106. Valve body 102 and sealing surface 108 are circumferentially disposed around central axis CA. Valve seat 104 includes base portion 110, seating surface 112 connected to base portion 110, and radially outermost edge 113. In an example embodiment, surface 112 is integral to base portion 110. Valve seat 104 and seating surface 112 are circumferentially disposed around central axis CA. By one element being integral with another element, we mean that the two elements are formed by a same single piece of material.

Sealing surface 108 includes radially inner edge 114 closest to central axis CA and radially outer edge 116 furthest from central axis CA. Seating surface 112 includes radially inner edge 118 closest to central axis CA and radially outer edge 120 furthest from central axis CA. Section line 2/3-2/3 is co-linear with plane P. Plane P is co-linear with central axis CA and passes only once through edge 114, edge 118, edge 116, edge 120, edge 109 (at point P1}, and edge 113 (at point P2). For example, plane P defines a partial cross-section of valve 100.

In the closed position of valve 100, at least a portion of sealing surface 108 is in contact with seating surface 112 and flow through valve 100 is blocked. In the open position of valve assembly 100, sealing surface 108 is free of contact with seating surface 112 to enable flow through valve 100. Any means known in the art can be used to transition valve 100 between the closed position and the open position.

Contact of surface 108 with surface 112 when transitioning from the open position of valve 100 to the closed position of valve 100 creates stress on surfaces 108 and 112. Sealing surface 108 and seating surface 112 are variously shaped to reduce the stress on sealing surface 108 and seating surface 112 and/or to locate stress on sealing surface 108 and seating surface 112 to predetermined positions. It is understood that the detailed shapes of sealing surface 108 and seating surface 112 are not visually apparent in FIGS. 2 and 3 and that the shapes of sealing surface 108 and seating surface 112 are depicted in FIGS. 4 through 12. It is understood that sealing surfaces 108 and seating surfaces 112 as depicted in FIGS. 4 through 12 are not necessarily to scale. Reference line R1 indicates the shape and contact area of surfaces 108 and 112 if surfaces 108 and 112 were linear in cross-section, as in the prior art.

In the example of FIGS. 4 and 5: at least a portion of surface 108 is convex; surface 108 tapers and curves to edges 114 and 116; at least a portion of surface 112 is concave; surface 112 tapers and curves to edges 118 and 120; surface 108 forms a single smooth curve from edge 114 to edge 116; and surface 112 forms a single complementary smooth curve from edge 118 to edge 120. In the example of FIGS. 4 and 5: an entirety of surface 108 is convex; and an entirety of surface 112 is concave, for example with respect to reference line RL.

Figure 6:
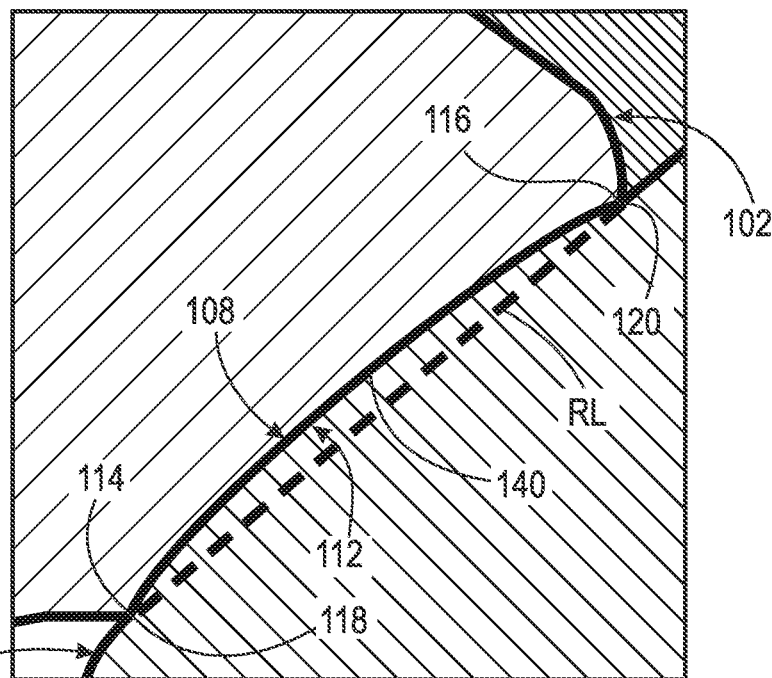
FIG. 6 is a detail of area 5-12 in FIG. 3.

FIG. 6 is a detail of area 5-12 in FIG. 3. In the example of FIG. 6: at least a portion of surface 108 is concave; surface 108 tapers and curves to edges 114 and 116; at least a portion of surface 112 is convex; surface 112 tapers and curves to edges 118 and 120; surface 108 forms a single smooth curve from edge 114 to edge 116; and surface 112 forms a single complementary smooth curve from edge 118 to edge 120. In the example of FIG. 6: an entirety of surface 108 is concave; and an entirety of surface 112 is convex, for example with respect to reference line RL.

Figure 7:
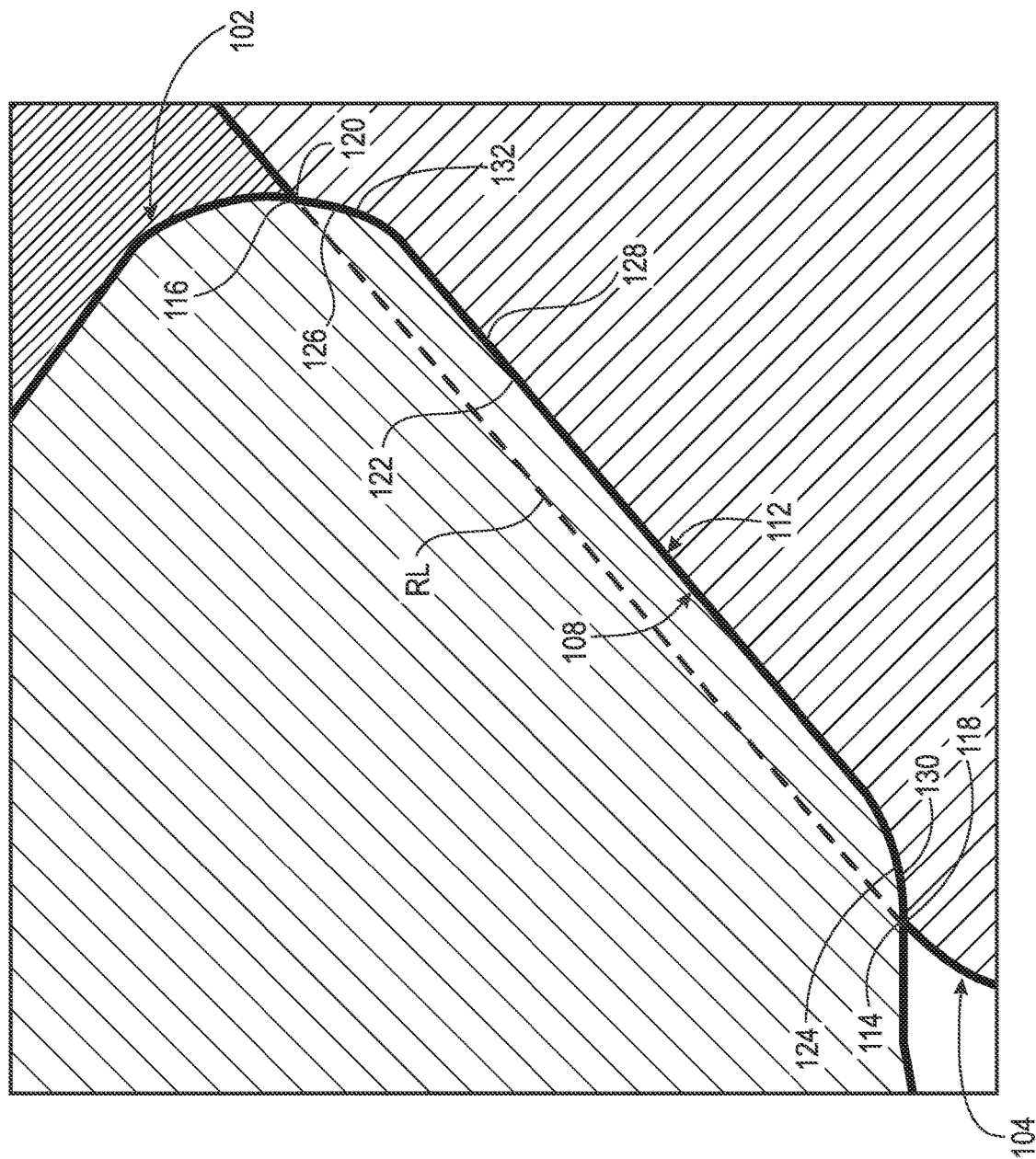
FIG. 7 is a detail of area 5-12 in FIG. 3.

FIG. 7 is a detail of area 5-12 in FIG. 3. In the example of FIG. 7, at least a portion of surface 108 is convex and at least a portion of surface 112 is concave, for example with respect to reference line RL. In the example of FIG. 7: sealing surface 108 includes portion 122 bracketed by portion 124 and by portion 126; and seating surface 112 includes portion 128 bracketed by portion 130 and by portion 132. Portion 124 includes edge 114 and portion 126 includes edge 116. Portion 130 includes edge 118 and portion 132 includes edge 120. In the example of FIG. 7: portion 122 forms a straight line; portions 124 and 126 are tapered and curved; portion 128 forms a straight line; and portions 130 and 132 are tapered and curved. In an example embodiment of FIG. 7: portions 124 and 126 are symmetrical; and portions 130 and 132 are symmetrical.

Figure 8:
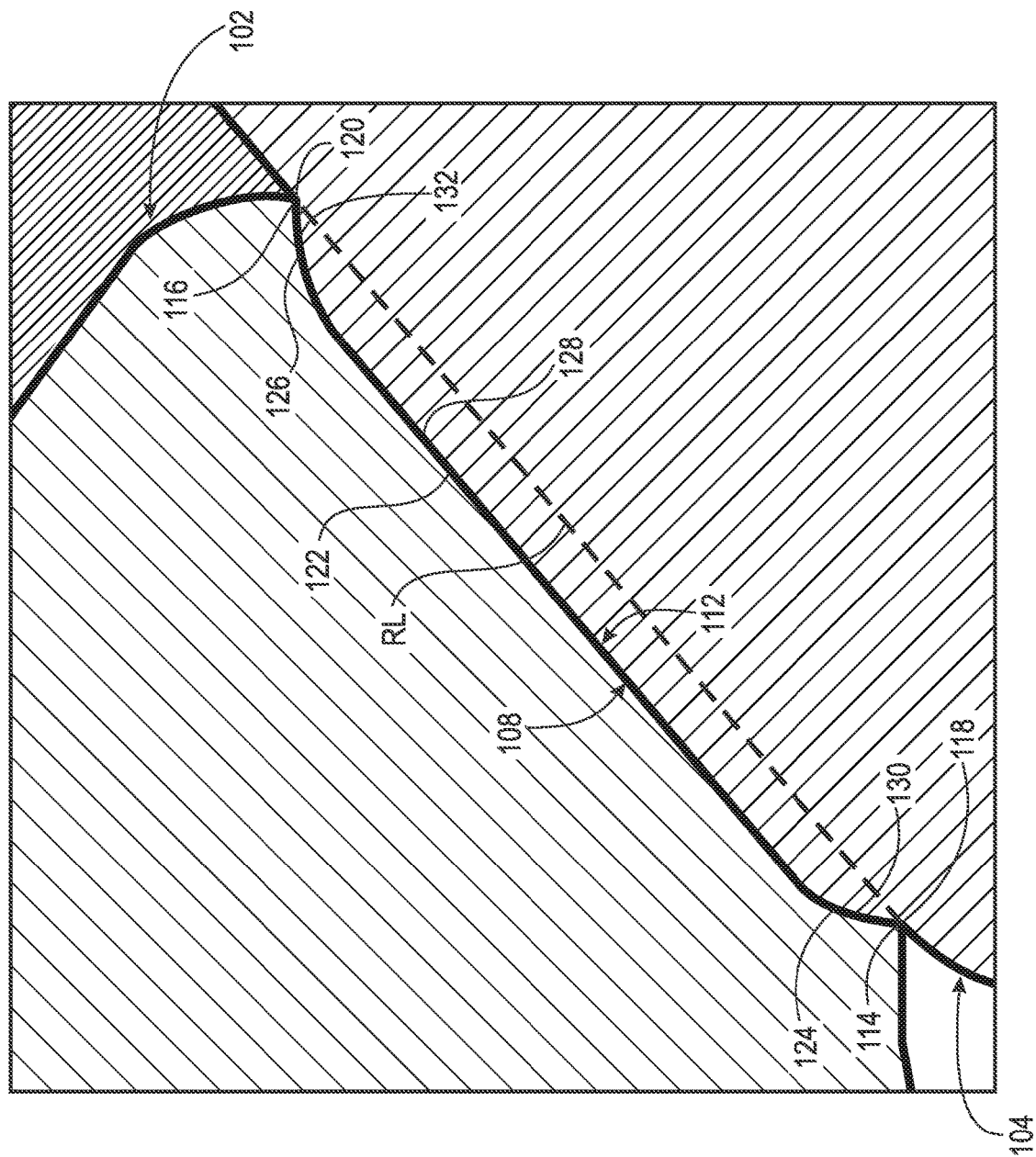
FIG. 8 is a detail of area 5-12 in FIG. 3.

FIG. 8 is a detail of area 5-12 in FIG. 3. In the example of FIG. 8, at least a portion of surface 108 is concave and at least a portion of surface 112 is convex, for example with respect to reference line RL In the example of FIG. 8: sealing surface 108 includes portion 122 bracketed by portion 124 and by portion 126; and seating surface 112 includes portion 128 bracketed by portion 130 and by portion 132. In the example of FIG. 8: portion 128 forms a straight line; portions 130 and 132 are tapered and curved; portion 122 forms a straight line; and portions 124 and 126 are tapered and curved. In an example embodiment of FIG. 8: portions 124 and 126 are symmetrical; and portions 130 and 132 are symmetrical.

Figure 9:
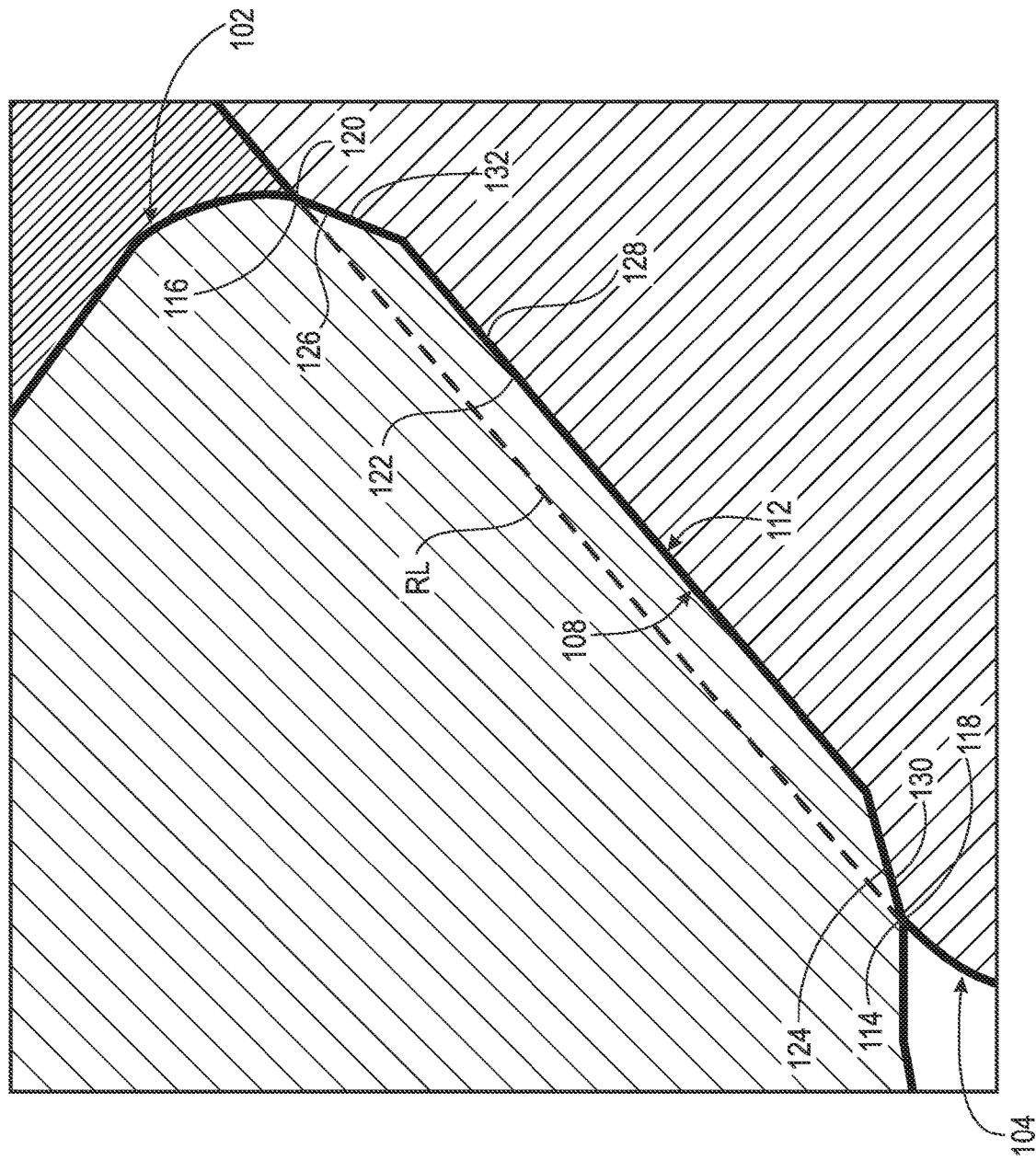
FIG. 9 is a detail of area 5-12 in FIG. 3.

FIG. 9 is a detail of area 5-12 in FIG. 3. In the example of FIG. 9, at least a portion of surface 108 is convex and at least a portion of surface 112 is concave, for example with respect to reference line RL In the example of FIG. 9: sealing surface 108 includes portion 122 bracketed by tapered portion 124 and by tapered portion 126; seating surface 112 includes portion 128 bracketed by tapered portion 130 and by tapered portion 132; portions 122, 124, and 126 form respective straight lines; and portions 128, 130, and 132 form respective straight lines. In an example embodiment of FIG. 9: portions 124 and 126 are symmetrical; and portions 130 and 132 are symmetrical.

In an example embodiment (not shown), at least a portion of surface 108 is concave and at least a portion of surface 112 is convex in plane P, for example with respect to reference line RL In the example embodiment: sealing surface 108 includes a first or central portion 134 bracketed by tapering second 136 and third portions 138; seating surface 112 includes a fourth portion bracketed by tapering fifth and sixth portions; and the first, second, third, fourth, fifth and sixth portions form respective straight lines in plane P.

Figure 10:
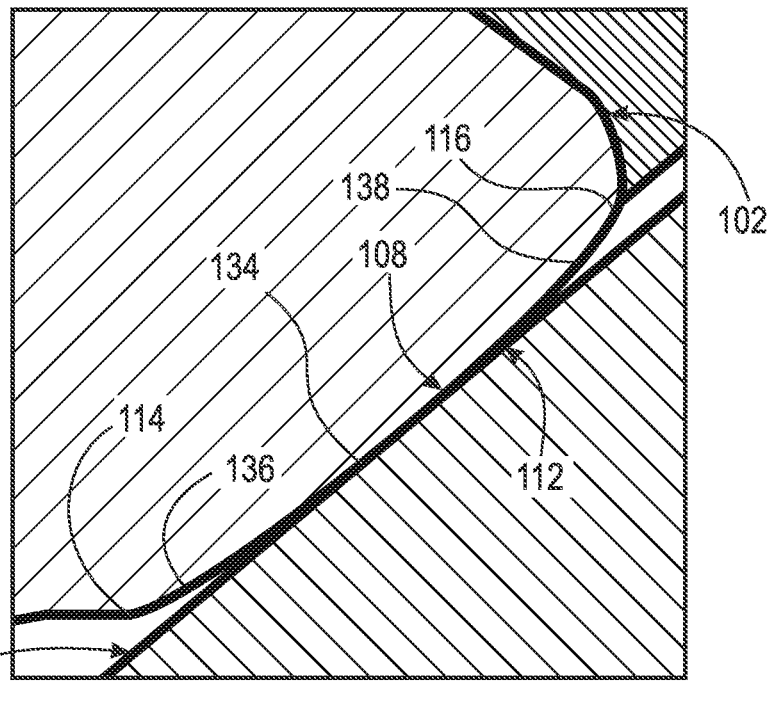
FIG. 10 is a detail of area 5-12 in FIG. 3.

FIG. 10 is a detail of area 5-12 in FIG. 3. In the example of FIG. 10, surface 108 includes: central portion 134 in contact with surface 112; portion 136 free of contact with surface 112 and tapering from central portion 134 to edge 114; and portion 138 free of contact with surface 112 and tapering from central portion 134 to edge 116. In the example of FIG. 10, portion 136 curves from central portion 134 to edge 114, and portion 138 curves from central portion 134 to edge 116. In the example of FIG. 10, surface 108 is convex. In the example of FIG. 10: surface 108 forms a smooth continuous curve from edge 114 to edge 116; and surface 112 forms a straight line. By "central portion 134" of surface 108, we mean a portion of surface 108 between edges 114 and 116 and not including edges 114 and 116.

Figure 11:
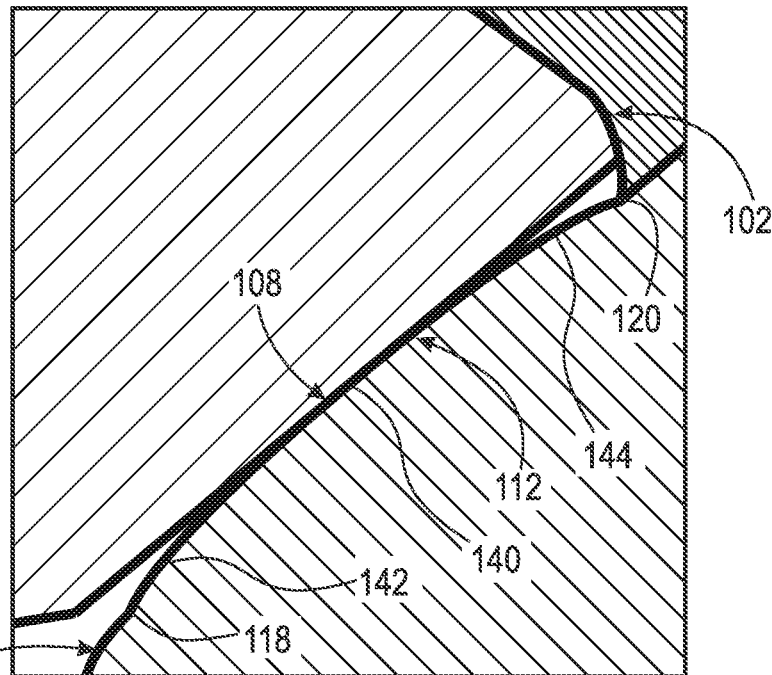
FIG. 11 is a detail of area 5-12 in FIG. 3.

FIG. 11 is a detail of area 5-12 in FIG. 3. In the example of FIG. 11, surface 112 includes: central portion 140 in contact with surface 108; portion 142 free of contact with surface 108 and tapering from central portion 140 to edge 118; and portion 144 free of contact with surface 108 and tapering from central portion 140 to edge 120. In the example of FIG. 11, portion 142 curves from central portion 140 to edge 118, and portion 144 curves from central portion 140 to edge 120. In the example of FIG. 11, surface 112 is convex. In the example of FIG. 11: surface 112 forms a smooth continuous curve from edge 118 to edge 120; and surface 108 forms a straight line. By "central portion 140" of surface 112, we mean a portion of surface 112 between edges 118 and 120 and not including edges 118 and 120.

In the example of FIG. 5, surface 108 includes central portion 134 and surface 108 tapers and curves from central portion 134 to edges 114 and 116. In the example of FIG. 6, surface 112 includes central portion 140 and surface 112 tapers and curves from central portion 140 to edges 118 and 120.

Figure 12:
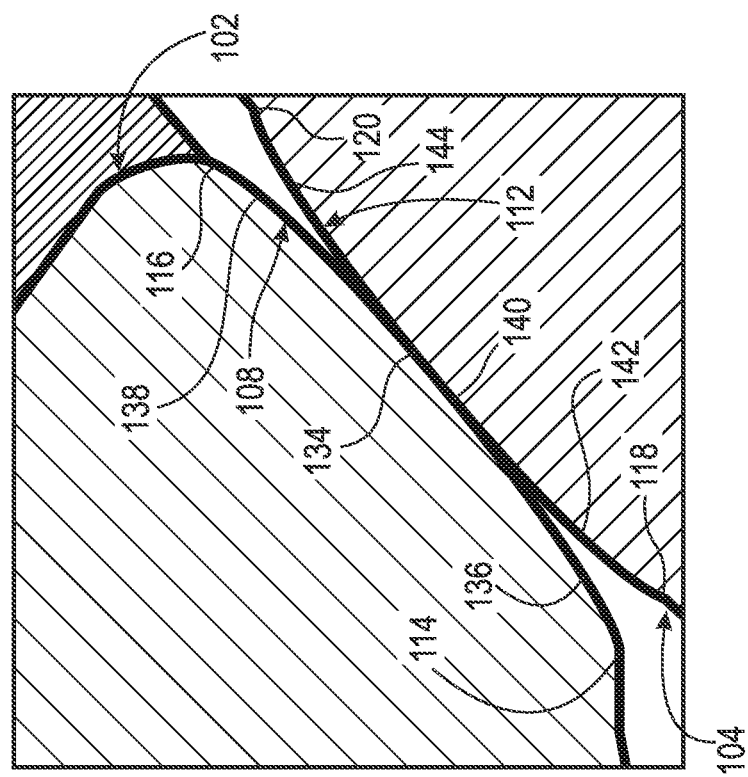
FIG. 12 is a detail of area 5-12 in FIG. 3.

FIG. 12 is a detail of area 5-12 in FIG. 3. In the example of FIG. 12: surface 108 includes portions 134, 136, and 138; and surface 112 includes portions 140, 142, and 144. Central portion 134 is in contact with central portion 140. Portions 136 and 138 are free of contact with surface 112. Portions 142 and 144 are free of contact with surface 108. Portion 136 tapers from central portion 134 to edge 114, portion 138 tapers from central portion 134 to edge 116, portion 142 tapers from central portion 140 to edge 118, and portion 144 tapers from central portion 134 central portion 140 to edge 120.

In the example of FIG. 12: portion 136 curves from central portion 134 to edge 114; portion 138 curves from central portion 134 to edge 116; portion 142 curves from central portion 140 to edge 118; and portion 144 curves from central portion 140 to edge 120. In the example of FIG. 12, surface 108 is convex, and surface 112 is convex. In the example of FIG. 12: surface 108 forms a smooth continuous curve from edge 114 to edge 116; and surface 112 forms a smooth continuous curve from edge 118 to edge 120.

In an example embodiment {not shown): at least a portion of surface 108 is convex and forms a circular arc in plane P; and at least a portion of surface 112 is concave and forms a complementary circular arc in plane P. In an example embodiment (not shown}: at least a portion of surface 108 is concave and forms a circular arc in plane P; and at least a portion of surface 112 is convex and forms a complementary circular arc in plane P. A circular arc is defined by a simple/constant radius.

Curved portions of surfaces 108 and 112 can assume any curvature known in the art. In an example embodiment, curved portions of surfaces 108 and 112 are defined by any mathematical functions known in the art, including but not limited to exponential functions.

Figure 13:
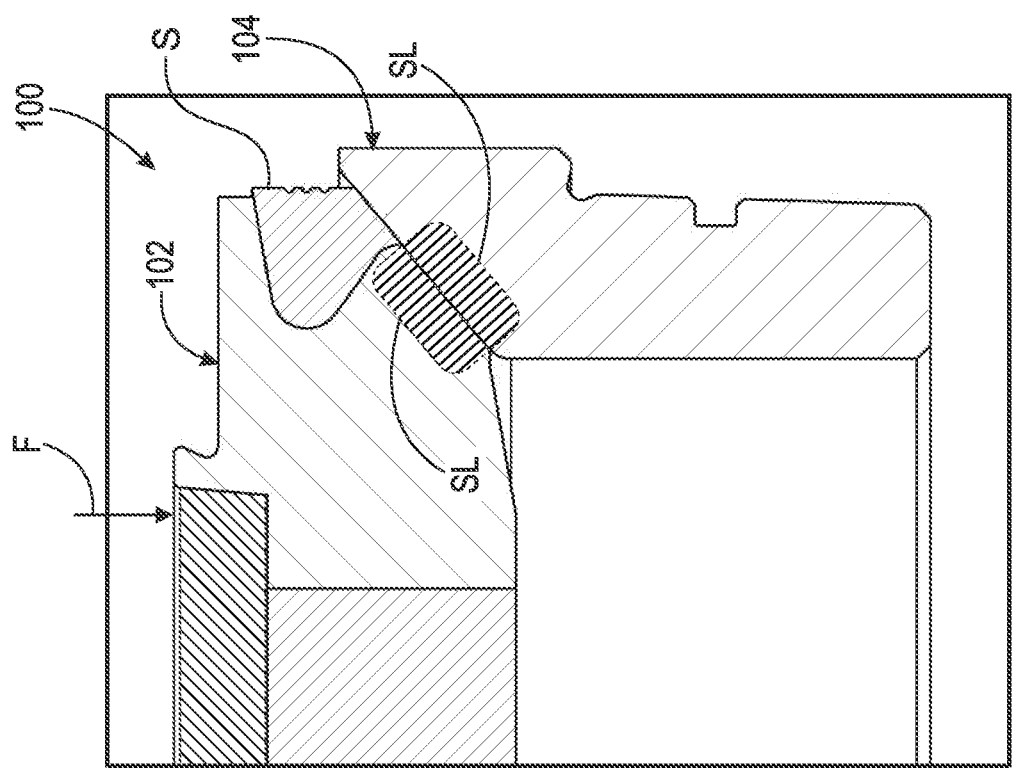
FIG. 13 is a detail of area 13-17 in FIG. 3 showing stress lines.

FIG. 13 is a detail of area 13-17 in FIG. 3 showing stress lines SL. In FIGS. 13 through 17, the length of a particular stress line SL is proportional to the stress associated with the portion of surface 108 or 112 from which the stress line SL extends. FIG. 13 shows stress line SL on surfaces 108 and 112, associated with the configuration shown in FIGS. 4 through 8, with the same closing force F displacing valve body 102 into contact with valve seat 104. The stress levels at edges 114, 116, 118, and 120 are reduced to below the levels associated with the central portions of surfaces 108 and 112, and stress levels are uniform between edges 114, 116, 118, and 120.

Figure 14:
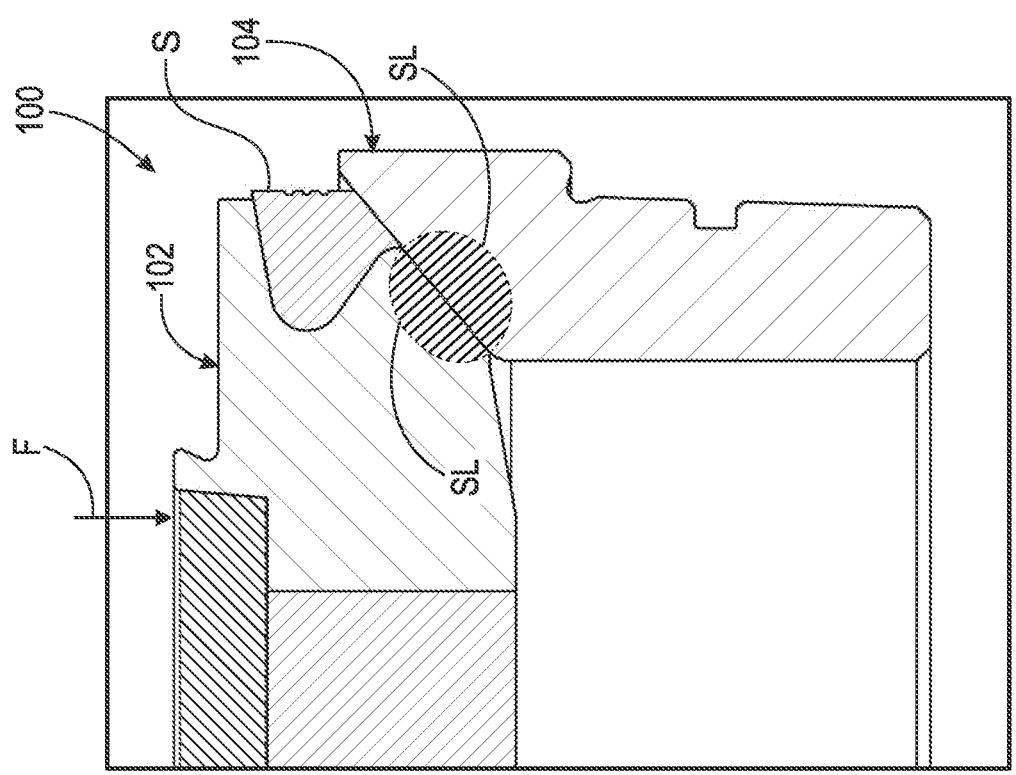
FIG. 14 is a detail of area 13-17 in FIG. 3 showing stress lines.

FIG. 14 is a detail of area 13-17 in FIG. 3 showing stress lines. FIG. 14 shows stress line SL on surfaces 108 and 112, associated with the configuration shown in FIG. 10, with the same force F displacing valve body 102 into contact with valve seat 104. In comparison with known valves, for example valve 200 above, the stress levels at edges 114, 116, 118, and 120 are significantly reduced.

Figure 15:
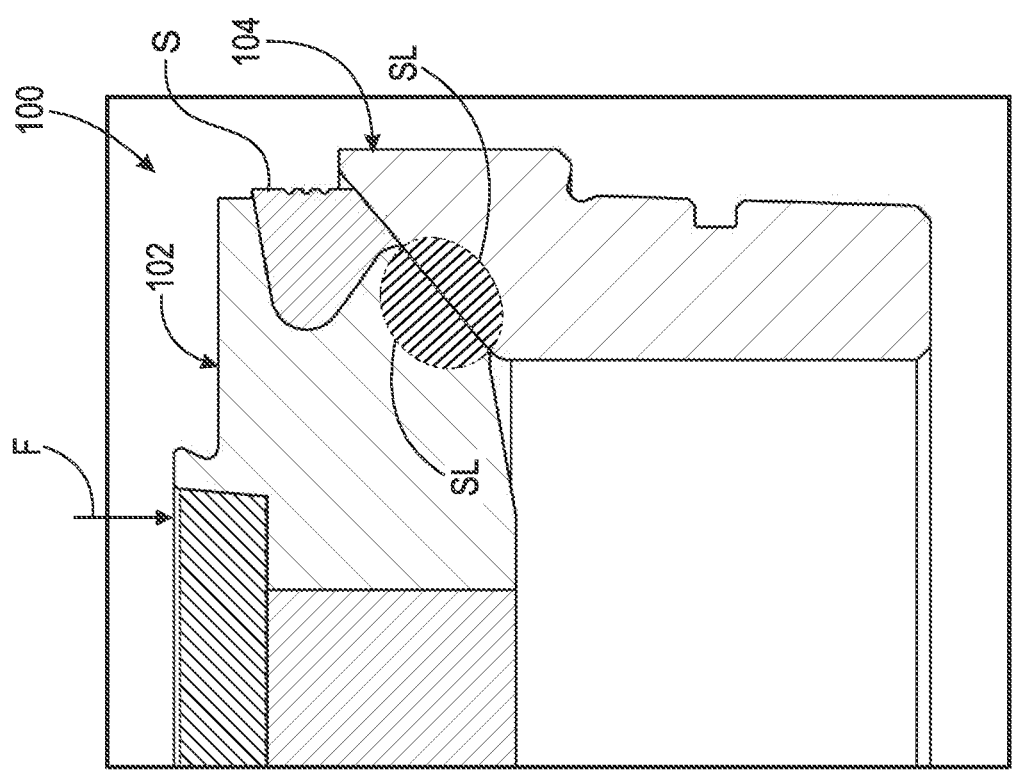
FIG. 15 is a detail of area 13-17 in FIG. 3 showing stress lines.

FIG. 15 is a detail of area 13-17 in FIG. 3 showing stress lines. FIG. 15 shows stress line SL on surfaces 108 and 112, associated with the configuration shown in FIG. 11, with the same force F displacing valve body 102 into contact with valve seat 104. The stress levels at edges 114, 116, 118, and 120 are reduced to below the levels associated with the central portions of surfaces 108 and 112.

FIG. 15 is a detail of area 13-17 in FIG. 3 showing stress lines. FIG. 15 shows stress line SL on surfaces 108 and 112, associated with the configuration shown in FIG. 11, with the same closing force F displacing valve body 102 into contact with valve seat 104. The stress levels at edges 114, 116, 118, and 120 are reduced to below the levels associated with the central portions of surfaces 108 and 112.

Figure 16:
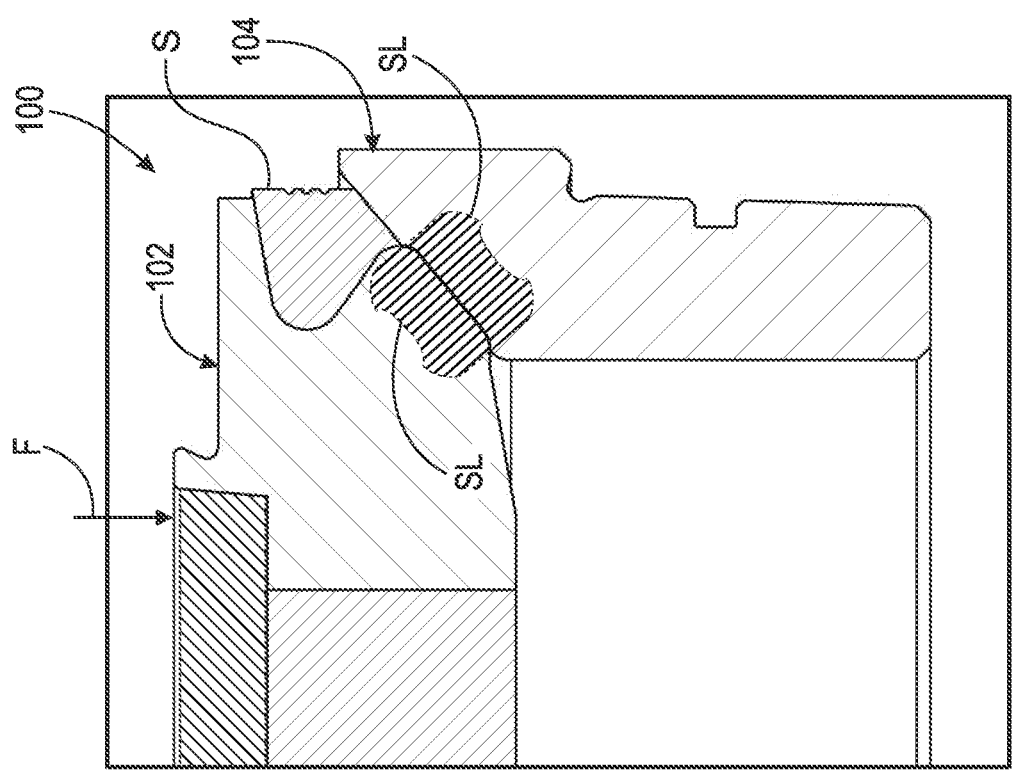
FIG. 16 is a detail of area 13-17 in FIG. 3 showing stress lines.

FIG. 16 is a detail of area 13-17 in FIG. 3 showing stress lines. FIG. 16 shows stress line SL on surfaces 108 and 112, associated with the configuration shown in FIG. 12, with the same closing force F displacing valve body 102 into contact with valve seat 104. The stress at edges 114, 116, 118, and 120 is substantially eliminated, while stress at portions 134 and 140 is elevated.

Figure 17:
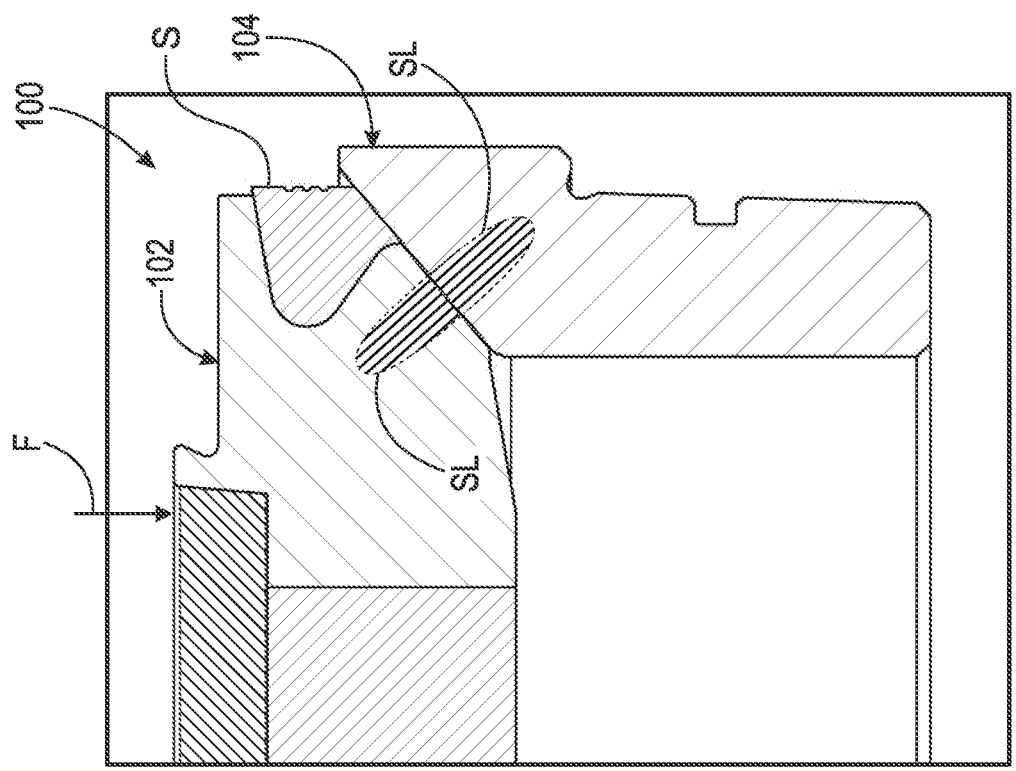
FIG. 17 is a detail of area 13-17 in FIG. 3 showing stress lines.
Figure 18:
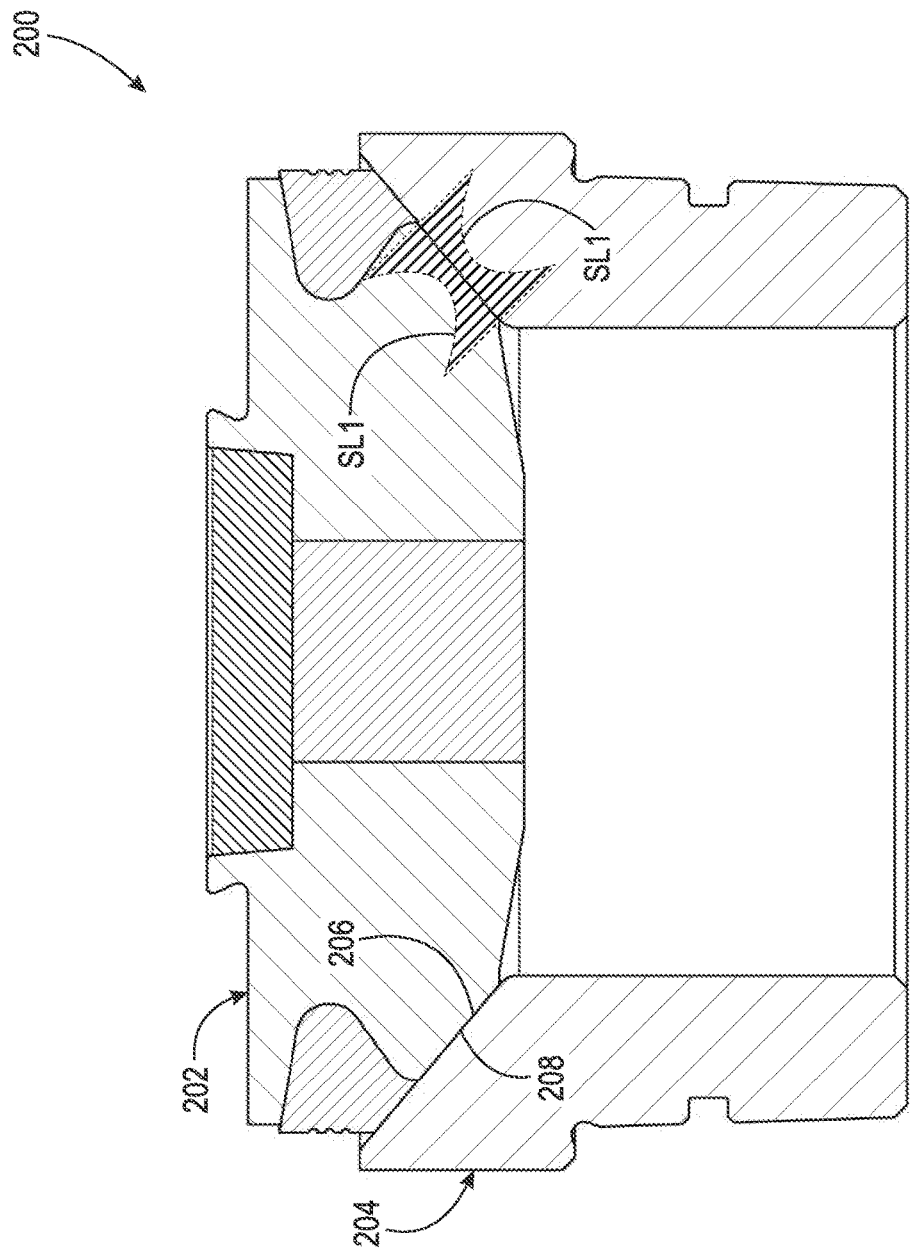
FIG. 18 is a cross-sectional view of a prior art valve in a closed position showing stress lines.

FIG. 17 is a detail of area 13-17 in FIG. 3 showing stress lines. FIG. 16 shows stress line SL on surfaces 108 and 112, associated with the configuration shown in FIG. 9, with the same closing force F displacing valve body 102 into contact with valve seat 104. The stress levels at edges 114, 116, 118, and 120 are greater than in portions 122 and 128, but less than at the edges in prior art FIG. 18 and stress levels between edges 114, 116, 118, and 120 are uniform.

As shown in FIGS. 13 through 17, the shapes of sealing surface 108 and seating surface 112 shown in FIGS. 4 through 12 eliminate or greatly reduce the edge stresses caused by contact between sealing surface 108 and seating surface 112 in the closed position of valve 100 and/or enable controlled positioning of stress areas for surfaces 108 and 112.

As seen in FIG. 13: there is no increased stress at edges 114, 116, 118, and 120; the stress field is optimized and substantially uniform beyond stress at edges 114, 116, 118, and 120; and the stress at edges 114, 116, 118, and 120 is less than in the uniform stress field.

As seen in FIGS. 14 and 15 and in comparison to FIG. 13, the stress at edges 114, 116, 118, and 120 is reduced.

As seen in FIG. 16, stress at edges 114, 116, 118, and 120 is essentially eliminated. The location of stress levels on surfaces 108 and 112 is selectable by locating portions 134 and 140 to predetermined positions on surfaces 108 and 112, respectively. For example: the location of stress on surface 108 with respect to edges 114 and 116 can be selected; and the location of stress on surface 112 with respect to edges 118 and 120 can be selected. Thus, the locations of the stresses can be selected according to the material characteristics of surfaces 108 and 112 to optimize the performance of valve body 102 and valve seat 104.

As seen in FIG. 17, there is additional stress on edges 114, 116, 118, and 120. However, the edge stress is considerably less than that shown in FIG. 18; and the remaining stress field is optimized and substantially uniform beyond stress at edges 114, 116, 118, and 120.

In an example embodiment, the transition between the closed position and the open position is at least partly controlled by actuator A, which is schematically shown in FIGS. 2 and 3.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
CA central axis
F dosing force
P plane
P1 point, valve body
P2 point, valve seat
R1 reference line
SL stress lines
SL1 stress lines
100 valve
102 valve body
104 valve seat
106 base portion, valve
108 sealing surface
109 radially outermost edge, valve body
110 base portion, valve seat
112 seating surface
113 radially outermost edge, valve seat
114 radially inner edge, sealing surface
116 radially outer edge, sealing surface
118 radially inner edge, seating surface
120 radially outer edge, seating surface
122 portion, sealing surface
124 portion, sealing surface
126 portion, sealing surface
128 portion, seating surface
130 portion, seating surface
132 portion, seating surface
134 portion, sealing surface
136 portion, sealing surface
138 portion, sealing surface
140 portion, seating surface
142 portion, seating surface
144 portion, seating surface
200 prior art valve
202 valve body
204 valve seat
206 sealing surface
208 seating surface

The invention claimed is:

1. A valve body, comprising:
a base portion including a radially outer edge wherein the base portion includes a sealing surface, circumferentially disposed around a central axis, and including a first portion including a radially inner edge of the sealing surface, a second portion including a radially outer edge of the sealing surface, and a third portion connecting the first portion and the second portion, wherein the base portion is arranged to be displaced to contact the third portion of the sealing surface with a seating surface of a valve seat of a valve to block flow through the valve; and wherein the first portion of the sealing surface tapers from the third portion of the sealing surface to the radially inner edge of the sealing surface, or the second portion of the sealing surface tapers from the third portion of the sealing surface to the radially outer edge of the sealing surface.

2. The valve body of claim 1, wherein:
the first portion of the sealing surface tapers from the third portion of the sealing surface to the radially inner edge of the sealing surface; and,
the second portion of the sealing surface tapers from the third portion of the sealing surface to the radially outer edge of the sealing surface.

3. The valve body of claim 2, wherein:
the first portion of the sealing surface curves from the third portion of the sealing surface to the radially inner edge of the sealing surface; and,
the second portion of the sealing surface curves from the third portion of the sealing surface to the radially outer edge of the sealing surface.

4. The valve body of claim 1, wherein the third portion of the sealing surface is convex.

5. The valve body of claim 1, wherein the sealing surface forms a continuous curve from the radially inner edge of the sealing surface to the radially outer edge of the sealing surface.

6. A valve seat, comprising:
a base portion; and,
a seating surface connected to the base portion, circumferentially disposed around a central axis, and including a first portion including a radially inner edge of the seating surface, a second portion including a radially outer edge of the seating surface, and a third portion connecting the first portion and the second portion, wherein the third portion of the seating surface is arranged to be contacted by a sealing surface of a valve body of a valve to block flow through the valve; and wherein the first portion of the seating surface tapers from the third portion of the seating surface to the radially inner edge of the seating surface, or the second portion of the seating surface tapers from the third portion of the seating surface to the radially outer edge of the seating surface.

7. The valve seat of claim 6, wherein:
the first portion of the seating surface tapers from the third portion of the seating surface to the radially inner edge of the seating surface; and,
the second portion of the seating surface tapers from the third portion of the seating surface to the radially outer edge of the seating surface.

8. The valve seat of claim 7, wherein:
the first portion of the seating surface curves from the third portion of the seating surface to the radially inner edge of the seating surface; and,
the second portion of the seating surface curves from the third portion of the seating surface to the radially outer edge of the seating surface.

9. The valve seat of claim 6, wherein the third portion of the seating surface is convex.

10. The valve body of claim 6, wherein the seating surface forms a continuous curve from the radially inner edge of the seating surface to the radially outer edge of the seating surface.

11. A valve, comprising:
a valve seat circumferentially disposed around a central axis and including a seating surface with a radially outer edge furthest from the central axis, a radially inner edge closest to the central axis, and a first portion; and,
a valve body circumferentially disposed around the central axis and including a sealing surface with a radially outer edge furthest from the central axis, a radially inner edge closest to the central axis, and a first portion, wherein the valve body is displaceable between a closed position and an open position; wherein in the closed position of the valve, the first portion of the sealing surface is in contact with the first portion of the seating surface to block flow through the valve; wherein the sealing surface tapers from the first portion of the sealing surface to one of the radially inner edge of the sealing surface or the radially outer edge of the sealing surface, or the seating surface tapers from the first portion of the seating surface to one of the radially inner edge of the seating surface or the radially outer edge of the seating surface; and wherein in the open position of the valve, the first portion of the sealing surface is free of contact with the first portion of the seating surface.

12. The valve of claim 11, wherein:
the sealing surface tapers from the first portion of the sealing surface to the radially inner edge of the sealing surface; and,
the sealing surface tapers from the first portion of the sealing surface to the radially outer edge of the sealing surface.

13. The valve of claim 12, wherein:
the sealing surface curves from the first portion of the sealing surface to the radially inner edge of the sealing surface; and,
the sealing surface curves from the first portion of the sealing surface to the radially outer edge of the sealing surface.

14. The valve of claim 11, wherein:
the sealing surface tapers from the first portion of the sealing surface to the one of the radially inner edge of the sealing surface or the radially outer edge of the sealing surface; and,
the first portion of the sealing surface is curved.

15. The valve of claim 11, wherein:
the sealing surface tapers from the first portion of the sealing surface to the radially inner edge of the sealing surface and to the radially outer edge of the sealing surface; and,
the sealing surface forms a continuous convex curve.

16. The valve of claim 11, wherein:
the seating surface tapers from the first portion of the seating surface to the radially inner edge of the seating surface; and,
the seating surface tapers from the first portion of the seating surface to the radially outer edge of the seating surface.

17. The valve of claim 16, wherein:
the seating surface curves from the first portion of the seating surface to the radially inner edge of the seating surface; and,
the seating surface curves from the first portion of the seating surface to the radially outer edge of the seating surface.

18. The valve of claim 11, wherein:
the seating surface tapers from the first portion of the seating surface to the one of the radially inner edge of the seating surface or the radially outer edge of the seating surface; and,
the first portion of the seating surface is curved.

19. The valve of claim 11, wherein:
the seating surface tapers from the first portion of the seating surface to the radially inner edge of the seating surface and to the radially outer edge of the seating surface; and,
the seating surface forms a continuous convex curve.

20. The valve of claim 11, wherein:
the seating surface forms a continuous convex curve; and,
the sealing surface forms a continuous convex curve.

* * * * *